(12) United States Patent
Chang et al.

(10) Patent No.: US 10,174,693 B2
(45) Date of Patent: Jan. 8, 2019

(54) PREDICTIVE TACHOMETER PROFILE GENERATION DURING IDLE REVVING EVENTS

(71) Applicant: GM GLOBAL TECHNOLOGY OPERATIONS LLC, Detroit, MI (US)

(72) Inventors: Richard I. Chang, Ann Arbor, MI (US); Matthew D. Whitton, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 124 days.

(21) Appl. No.: 15/234,723

(22) Filed: Aug. 11, 2016

(65) Prior Publication Data

US 2018/0045129 A1 Feb. 15, 2018

(51) Int. Cl.
| | |
|---|---|
| *B60K 35/00* | (2006.01) |
| *F02D 41/00* | (2006.01) |
| *F02D 41/22* | (2006.01) |
| *F02D 41/26* | (2006.01) |
| *G01P 3/46* | (2006.01) |
| *G07C 5/06* | (2006.01) |
| *G07C 5/08* | (2006.01) |
| *G01P 1/07* | (2006.01) |
| *F02D 41/14* | (2006.01) |

(52) U.S. Cl.
CPC ....... *F02D 41/0097* (2013.01); *F02D 41/222* (2013.01); *F02D 41/26* (2013.01); *G01P 1/07* (2013.01); *G01P 3/465* (2013.01); *G07C 5/06* (2013.01); *G07C 5/0816* (2013.01); *B60K 35/00* (2013.01); *F02D 2041/1412* (2013.01)

(58) Field of Classification Search
CPC .... F02D 41/222; F02D 41/26; F02D 41/0097; F02D 2041/1412; F02D 2200/101; F02D 2200/501; F02D 2200/602; G01P 3/465; G01P 1/07; G07C 5/06; G07C 5/0816; B60K 35/00; B60K 2350/352; B60K 2350/1064

USPC ........... 123/436; 701/110; 73/114.24, 114.25
See application file for complete search history.

(56) References Cited

U.S. PATENT DOCUMENTS

| | | | |
|---|---|---|---|
| 5,835,875 A | 11/1998 | Kirchhoffer et al. | |
| 6,625,562 B2 * | 9/2003 | Hayashi | G01P 1/08 702/142 |
| 7,841,962 B2 * | 11/2010 | Boutell | F16H 61/0213 477/120 |
| 9,347,557 B2 * | 5/2016 | Doering | F16H 63/42 |
| 9,696,333 B2 * | 7/2017 | Teratani | G01P 1/07 |

(Continued)

OTHER PUBLICATIONS

Chang, Richard I. et al., U.S. Appl. No. 15/220,912, entitled "Predictive Tachometer Profile Generation During Transmission Shift Events," filed Jul. 27, 2016.

(Continued)

*Primary Examiner* — Hai H Huynh
*Assistant Examiner* — Gonzalo Laguarda
(74) *Attorney, Agent, or Firm* — Lorenz & Kopf, LLP (57) ABSTRACT

Methods and systems are provided for generating a predictive tachometer profile at a tachometer of a vehicle. An engine speed offset can be generated based on an engine acceleration and an accelerator pedal position rate. A predictive tachometer profile displayed at the tachometer can then be generated based on the engine speed offset and an actual engine speed.

14 Claims, 7 Drawing Sheets

(56) References Cited

U.S. PATENT DOCUMENTS

| | | | | |
|---|---|---|---|---|
| 9,897,625 B2* | 2/2018 | Teratani | .................... | G01P 1/07 |
| 2005/0280521 A1* | 12/2005 | Mizumaki | .............. | B60K 35/00 |
| | | | | 340/438 |
| 2015/0151738 A1 | 6/2015 | Dlugoss et al. | | |
| 2015/0175004 A1* | 6/2015 | Yasunaga | ............... | B60K 35/00 |
| | | | | 340/441 |
| 2016/0010746 A1 | 1/2016 | Turner et al. | | |
| 2016/0138468 A1* | 5/2016 | Shibata | ................... | F02B 77/08 |
| | | | | 701/110 |
| 2017/0120750 A1* | 5/2017 | Romani | ............ | B60W 50/0097 |
| 2018/0032650 A1* | 2/2018 | Chang | .................... | F16H 63/40 |

OTHER PUBLICATIONS

USPTO, Office Action for U.S. Appl. No. 15/220,912 dated Jun. 8, 2018.

* cited by examiner

Engine speed offset lookup table

| Accelerator pedal rate (%/second) | Current engine acceleration (RPM/s) |
|---|---|

Row 1 = values of current engine acceleration

Rows 2...m

Columns 2...n

Column 1 = values of accelerator pedal rate

PREDICTIVE TACHOMETER PROFILE GENERATION DURING IDLE REVVING EVENTS

TECHNICAL FIELD

The present invention generally relates to tachometers used in vehicles, and more particularly relates to a predictive tachometer that, during idle revving events, generates a predictive tachometer profile that can be displayed at a tachometer.

BACKGROUND

A tachometer is a gauge that is part of a vehicle's instrumentation panel that displays a value of engine speed usually in revolutions per minute (RPM). In some implementations, a source of engine speed (e.g., crankshaft or camshaft position sensor) can be directly wired to the instrumentation panel that houses the tachometer. In other implementations, engine speed can be computed via an engine control module (ECM) based on information derived from either the crankshaft or camshaft speed sensor and an engine speed signal can be indirectly sent to the tachometer via serial data communication (e.g., via a controller area network (CAN) bus). Traditionally engine speed was displayed on a calibrated analogue dial that includes a needle fixed about a point that is directed to one of a plurality of numerical indications, i.e., 1000 RPM, 2000 RPM, 4000 RPM, and others. More recently, digital tachometers have become the state of the art for presenting engine speed.

Tachometers can allow the driver to visually assess operating speed of the engine, and assist the driver in selecting appropriate throttle and gear settings for the driving conditions. A driver of the automobile reads the tachometer to determine whether or not to shift gears or adjust the speed of the automobile. The driver should shift gears at selected engine speeds to extract maximum power from the engine and achieve maximum vehicle speed. Shifting to a higher transmission gear (or upshifting) too early often results in a loss of power and causes reduced acceleration or even stalling. Upshifting too late may result in over-revving the engine, that is, reaching an engine speed greater than a maximum recommended speed, which can cause damage to the engine or other portions of the drive train. Shifting to a lower transmission gear (or downshifting) at the wrong time often causes over-revving of the engine, which is commonly called "Redlining" the engine. Redlining may damage the engine. Unfortunately, it is often difficult to be able to shift at an appropriate time.

When the engine of the vehicle responds to the driver of the vehicle depressing the accelerator (e.g., while driving or when the vehicle is in park or neutral), this causes a corresponding response at the tachometer that can be viewed by the driver. In addition, events such as shifting gears can also cause a response at the tachometer to change. In most cases, the driver can also hear the response of the engine as the accelerator is depressed or when gears are shifted. In an ideal operating scenario, the response of the tachometer would match or be synchronized with the response of the vehicle to the acceleration or gear shift. For example, the tachometer needle or display should begin moving as soon as engine speed is transitioning since a synchronized engine sound and tachometer can greatly improve perception of powertrain performance.

However, in a real vehicle, there are many sources of delay in the signal path between the sensors that measure engine speed (or source of engine speed) and the tachometer (of the instrument panel) that displays an indication of rpm. These sources of delay cause the response that is presented on the tachometer to be out of synchronization with (or lag) the response of the vehicle to the acceleration or gear shift. For instance, some sources of the delayed response at the tachometer can include: delay in the engine's response to the driver interacting with the accelerator (or gear shifter); delay associated with an engine speed determination in an engine control module (ECM); delays associated with vehicle communication systems such as a high-speed controller area network (CAN) bus and a low-speed CAN bus; delays associated with a body control module (BCM); delay associated with internal signal processing by the instrument panel (IP); delay associated with dead-band filtering in the IP (calibration); delay associated with displaying the RPM indication at the tachometer, etc. As such, there are many sources that can contribute to a delayed response of the tachometer. A delayed tachometer response can contribute to negative perception by the user that the engine and/or transmission may be sluggish.

There is a need for tachometers that can provide improved performance and that can improve the user's perception of powertrain performance by mitigating communication delays between source of engine speed and the tachometer. There is a need for tachometer s that exhibit improved responsiveness despite many sources of delay that exist in a signal path between the tachometer and the sensors that measure engine speed. It would be desirable to provide a tachometer that generates an engine speed signal with reduced response delay so that the tachometer output at an instrumentation panel more closely matches that actual engine speed. Furthermore, other desirable features and characteristics of the present invention will become apparent from the subsequent detailed description of the invention and the appended claims, taken in conjunction with the accompanying drawings and this background of the invention.

BRIEF SUMMARY

Methods and systems are provided for generating a predictive tachometer profile at a tachometer of a vehicle. An engine speed offset can be generated based on an engine acceleration and an accelerator pedal position rate. A predictive tachometer profile can then be generated based on the engine speed offset and an actual engine speed. The predictive tachometer profile can be displayed at the tachometer.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

In accordance with the disclosed embodiments, a vehicle is provided that includes an improved tachometer. As used herein, the term "predictive tachometer" can refer to a controller (e.g., predictive tachometer module) that generates a predictive tachometer profile. The predictive tachometer profile is an artificial engine speed signal that is shifted to account for delays between an engine speed sensor (e.g., crankshaft position sensor or camshaft position sensor) and a tachometer where engine speed is displayed to the driver. The predictive tachometer profile is computationally adjusted version of engine speed that accounts for delays in generating and communicating that engine speed information to the tachometer to provide a more dynamic representation of engine speed based on driver pedal input.

In one embodiment, a predictive tachometer profile is generated that is displayed at a tachometer of a vehicle. When idle revving event is determined to be in progress and indicative of a situation that allows for the predictive tachometer profile to be displayed, an engine speed offset can be generated and used to compute the predictive tachometer profile. Idle revving refers to an operational scenario when the vehicle can be in park or neutral while the vehicle's accelerator pedal is being depressed. The engine speed offset can be generated (e.g., computed) based on: a current engine acceleration and an accelerator pedal rate that is determined based on the accelerator pedal position. The predictive tachometer profile can then be computed based on the sum of a current engine speed and the engine speed offset. By providing the predictive tachometer profile to the tachometer during idle revving events, the dynamic response at the tachometer can account for communication delays between the source of engine speed and the instrumentation panel where the tachometer is located. The profile shape of the predictive tachometer profile is controllable based on the engine speed offset that is a function of current engine acceleration and the accelerator pedal position rate. This can improve the user/driver experience since the engine speed displayed at the tachometer more closely matches the commanded engine torque, which improves the user/driver's perception of powertrain performance.

Figure 1:
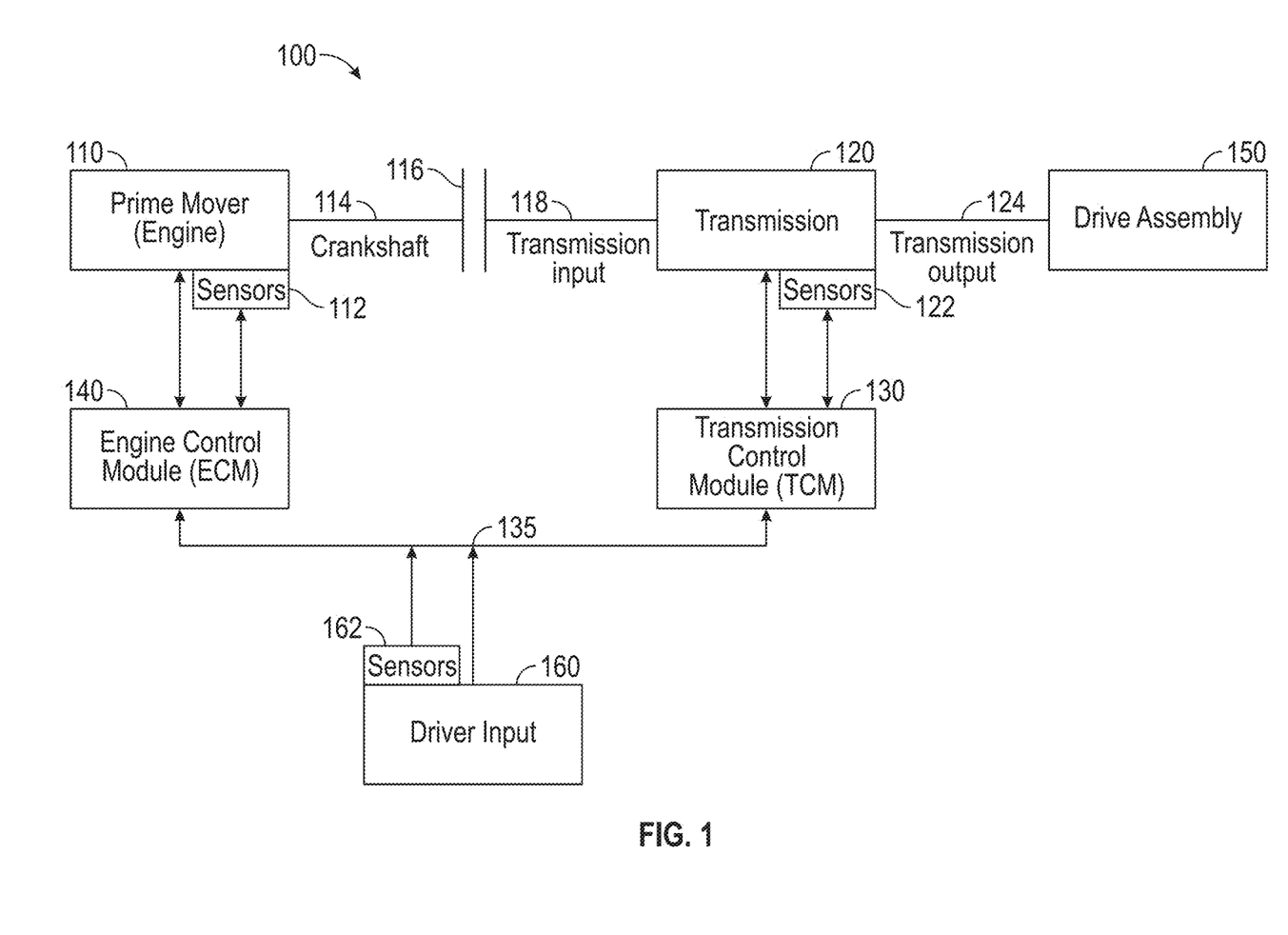
FIG. 1 is functional block diagram of a powertrain system of a motor vehicle in accordance with an embodiment of the present disclosure.

FIG. 1 is functional block diagram of a powertrain system 100 of a motor vehicle in accordance with an embodiment of the present disclosure. The components of the powertrain system 100 include a prime mover 110, a transmission 120, a transmission control module (TCM) 130, an engine control module (ECM) 140, a driveshaft 150, a driver input 160, and various blocks of sensors 112, 122, 162, 172.

As used herein, a "module" can refer to a controller or software executed at a controller that controls vehicle systems, sub-systems, actuators, sensors, switches and the like. Each module in a vehicle can perform a certain functions for a controlling a certain vehicle system or sub-system, such as an engine, transmission, chassis, etc. Non-limiting examples of vehicle modules can include, for example, an Engine Control Unit (ECU) or Engine Control Module (ECM), a Transmission Control Module (TCM), a chassis control module (CCM), a Body Control Module (BCM), etc.

The prime mover 110 may be an internal combustion engine (ICE) such as a gasoline, Diesel or flex fuel engine, or a hybrid or electric power plant. The prime mover 110 includes a crankshaft 114 which drives a turbine or input clutch 116. A turbine is used for a planetary transmission, while an input clutch is used for a dual clutch transmission or automated manual transmission. The turbine/clutch 116 selectively provides drive torque to an input shaft 118 of a transmission 120.

The transmission 120 can include a housing as well as shafts, gears and synchronizer clutches (all not illustrated) which cooperatively provide, for example, multiple forward and reverse gears. In addition to the input shaft 118, the transmission 120 includes an output shaft 124 which is coupled to a final drive assembly 150 that may include, for example, a driveshaft, a differential assembly, drive axles, and wheels that are driven.

The transmission control module (TCM) 130 is a controller, microprocessor or other electronic device that performs a variety of transmission monitoring and control tasks to assist in the control of the transmission to help it operate more efficiently and more reliably. The TCM regulates the transmission by processing electrical signals received from various sensors 122, 172 to help the vehicle's transmission work efficiently and dependably.

The engine control module (ECM) 140 is a controller, microprocessor or other electronic device that performs a variety of engine monitoring and control tasks. The ECM 140 reads data from various sensors engine sensors, and processes that data to control a series of actuators associated with the engine to ensure optimal performance. The TCM and ECM 130, 140 can share information with each other over a network 135, such as a Controller Area Network (CAN) bus 135. The ECM 140 and/or the TCM 130 control powertrain output torque.

A driver input 160 communicates with the TCM 130 and ECM 140 via a bus 135. The driver input 160 generally includes those controls and devices under the control of and operated by the vehicle operator (not illustrated). The driver input 160 can include, but is not limited to, an accelerator pedal, a brake pedal, a transmission range selector (e.g., a PRNDL lever), etc.

The prime mover 110, transmission 120, and the driver input 160 can each have various sensors associated with each. Each block of sensors 112, 122, 162 in FIG. 1 can include one or more sensors. Sensors 112, 162 can provide real time data to the ECM 140, whereas sensors 122, 162 can provide real time data to the TCM 130.

Sensors 112 can include, for example, engine speed sensors such as a crank position sensor that can detect position and/or speed of a crankshaft and/or a cam position sensor that can detect position and/or speed of a camshaft, and provide that information to the ECM 140. For example, the crank position sensor can be used to detect position of crankshaft 114, and the cam position sensor can be used to detect position of camshaft (not illustrated). In either case, the raw position signal (in terms of frequency (Hz)) can be sent to ECM 140 and conditioned/converted to speed (in terms of rpm). In this regard, the engine speed signals may be considered raw engine speed signals until signal conditioned by the ECM 140 or other signal conditioning circuitry. The sensors 112 can also include a wheel speed sensor 221 that can detect true vehicle speed and provide it to the ECM via a chassis control module.

Sensors 122 can include, for example, a transmission input speed sensor (TISS) that senses the instantaneous speed of the input shaft 118 of the transmission 120, a transmission output speed sensor (TOSS) senses the instantaneous speed of the output shaft 124 of the transmission 120, a transmission range selector sensor that is configured to generate an output signal which indicates which gear range (e.g. forward, neutral, and reverse)) is selected), a tap switch sensor that provides information regarding tap mode status that shows whether driver is in control of transmission commanded gear. The sensors 122 can then provide that information to the TCM 130.

Sensors 162 can include, for example, an accelerator position sensor that senses the instantaneous position of an accelerator pedal (not illustrated), a brake pedal position sensor that senses the position of a brake pedal (also not illustrated), etc. The sensors 162 can then provide that information to the ECM 140. The ECM 140 can compute the driver's commanded engine torque based on the vehicle speed and the position of accelerator pedal. The ECM 140 can also use the instantaneous position of the accelerator pedal (from an accelerator pedal position sensor) to compute a rate of the accelerator pedal position (or accelerator pedal position rate), and use the engine speed (from a crank sensor or cam sensor) to compute an engine acceleration.

Figure 2A:
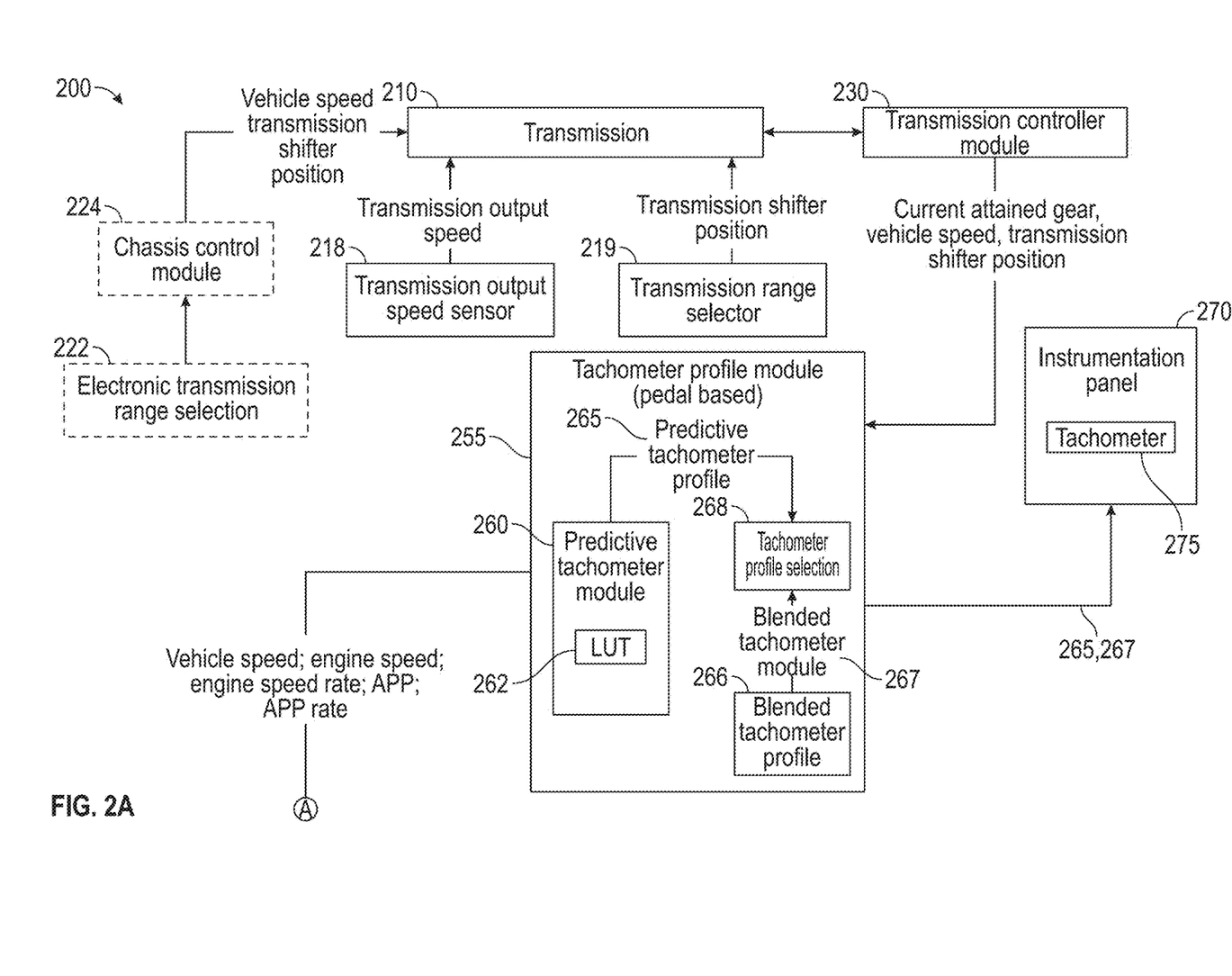
FIGS. 2A and 2B are a functional block diagram that collectively illustrates a system of a motor vehicle that is used to generate a predictive tachometer profile in accordance with an embodiment of the present disclosure.
Figure 2B:
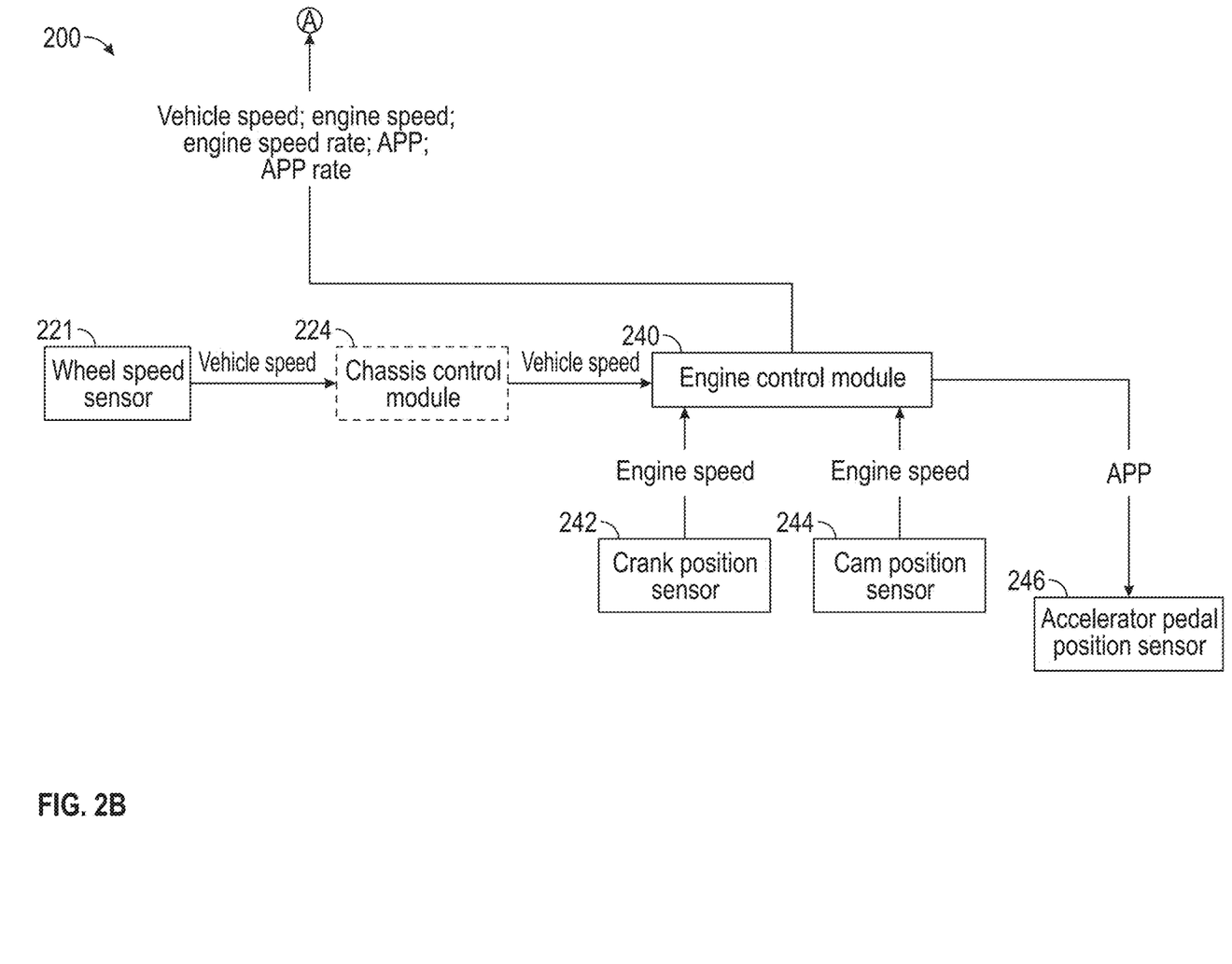

FIGS. 2A and 2B are a functional block diagram that collectively illustrates a system 200 of a motor vehicle that is used to generate a predictive tachometer profile 265 in accordance with an embodiment of the present disclosure.

The vehicle system 200 includes a transmission 220, a TCM 230 for the transmission 220, an ECM 240 for an engine (not illustrated), and a tachometer profile module 255 that includes a predictive tachometer module 260, a blended tachometer module 266, and a tachometer profile selection module 268. The predictive tachometer module 260 can generate the predictive tachometer profile 265, whereas the blended tachometer module 266 can generate a blended tachometer profile 267. The tachometer profile selection module 268 can select either the predictive tachometer profile 265 or the blended tachometer profile 267, and output the selected profile to a tachometer 275. The tachometer 275 can be part of the vehicle's instrumentation panel 270, and is used to display the selected profile. The vehicle system 200 also includes various sensors and modules that are used to provide or acquire information and provide that information to the tachometer profile module 255 for use in generating the predictive tachometer profile 265 and the blended tachometer profile 267. The sensors and modules can include a transmission range selector 219, a transmission output speed sensor 218, a wheel speed sensor 221, a chassis control module 224, a crank position sensor 242, a cam position sensor 244, a brake pedal position sensor 250, and an accelerator pedal position sensor 246. In addition, in some embodiments, the vehicle can include an electronic transmission range selector 222 that can provide transmission shifter position.

The basic functions of the TCM 230 and ECM 240 are described above with reference to FIG. 1, and for sake of brevity, that description of the TCM 230 and ECM 240 will not be repeated.

The transmission output speed sensor 218 can determine (measure or alternatively sense) output speed of the transmission 210, and output a signal representative of transmission output speed. In one embodiment, the transmission output speed sensor 218 serves as a primary source for vehicle speed, and a wheel speed sensor serves a secondary source (e.g., when a backup sensor is needed in case the transmission output sensor 218 faults). Vehicle speed can be calculated using transmission output speed sensor or wheel speed sensor. In one embodiment, the vehicle speed can be used to determine whether neutral or idle rev can be active or not (e.g., active if vehicle speed is zero and transmission is in park/neutral).

The transmission range selector 219 can output a signal representative of transmission shifter position and communicate it over a bus to the TCM 230. The TCM 230 can provide the transmission shifter position to the predictive tachometer module 260, and the predictive tachometer module 260 can use the transmission shifter position as one of the input parameters used in generating the predictive tachometer profile 265. For example, the transmission shifter position can be used as part of profile abort case in case the driver shifts from neutral or park into drive. In such case, the transmission shifter position can be used to blend the predictive tachometer profile back to engine speed.

In some embodiments, the vehicle includes an electronic transmission range selector 222 (shown in a dotted-line block since it is optional) as opposed to the transmission range selector 219. To explain further, some transmissions are equipped with traditional cable based transmission range selectors 219, whereas other transmissions are equipped with an electronic transmission range selector 222 that can be used to determine transmission shifter position. In such embodiments, the chassis control module 224 can output a signal representative of vehicle speed and the transmission shifter position and communicate them over a bus to the TCM 230 and/or the ECM 240. The TCM 230 can provide the vehicle speed and the transmission shifter position to the predictive tachometer module 260, and the predictive tachometer module 260 can use the vehicle speed and the transmission shifter position as input parameters used in generating the predictive tachometer profile 265. In addition, to provide backup protection in the event that the transmission output speed cannot provide the information used to provide the vehicle speed, the wheel speed sensor 221 can communicate vehicle speed to the CCM 224.

The TCM 230 can also determine can determine the current attained gear (whether gear is in park or neutral), and provide this information to the predictive tachometer module 260.

The crank position sensor 242 or the cam position sensor 244 can both determine (measure or alternatively sense and output) position and/or speed of the engine 220, and output a signal representative of engine position and/or speed. In one embodiment, the crank position sensor 242 or the cam position sensor 244 can communicate the current engine speed over the bus to the ECM 240, and the ECM 240 can compute an engine acceleration and provide the current engine speed and the engine acceleration to the predictive tachometer module 260. In another embodiment, the crank position sensor 242 or the cam position sensor 244 can send engine position over the bus to the ECM 240, and the ECM 240 can use the engine position to compute current engine speed and an engine acceleration and provide current engine speed and the engine acceleration to the predictive tachometer module 260.

The accelerator pedal position sensor 246 can determine (measure or alternatively sense and output) position of the accelerator pedal, and output a signal representative of accelerator pedal position and/or accelerator pedal position rate. In one embodiment, the accelerator pedal position sensor 246 can communicate the accelerator pedal position and accelerator pedal position rate over the bus to the ECM 240, and the ECM 240 can provide the accelerator pedal position and accelerator pedal position rate to the predictive tachometer module 260. In another embodiment, the accelerator pedal position sensor 246 can send the accelerator pedal position over the bus to the ECM 240, and the ECM 240 can compute the accelerator pedal position rate and provide the accelerator pedal position rate to the predictive tachometer module 260 along with the accelerator pedal position.

The tachometer profile module 255 can be implemented a control unit that exists within the vehicle (e.g., the ECM or TCM) or as an independent controller that is dedicated to generating information that is displayed at an instrumentation panel of the vehicle. The tachometer profile module 255 can include without limitation: a main memory, one or more processing system(s), a network interface device (NID) for interfacing with various systems including the ECM and TCM. The tachometer profile module 255 interconnects the various systems with the processing system(s) and the main memory, and also includes functionality for providing network connectivity through the NID. The processing system(s) communicates with main memory and the NID via chipset and appropriate buses (e.g., CAN busses). Processing system(s) can be implemented using one or more general-purpose processing devices such as a microprocessor, central processing unit, or the like. The processing system(s) may also be one or more special-purpose processing devices such as an application specific integrated circuit (ASIC), a field programmable gate array (FPGA), a digital signal processor (DSP), network processor, or the like. The processing system(s) can include one or more central processing units ("CPUs") that operate in conjunction with a chipset that provides an interface to various forms of computer-readable storage media including a main memory (e.g., read-only memory (ROM), flash memory, dynamic random access memory (DRAM) such as synchronous DRAM (SDRAM)), and storage devices (not illustrated). The processing system(s) can communicate with the various forms for computer-readable storage media via the chipset and appropriate buses. The processing system(s) perform arithmetic and logical operations necessary for the operation of the tachometer profile module 255. The processing system(s) can perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The main memory of the tachometer profile module 255 may be composed of many different types of memory components. The main memory can include non-volatile memory (such as read-only memory (ROM), flash memory, etc.), and volatile memory (such as random access memory (RAM)), or some combination of the two. The volatile memory includes a computer-readable medium on which is stored one or more sets of instructions (e.g., executable code for one or more programs) that can be loaded and executed at processing system(s) to cause the processing system(s) to perform various functions of the tachometer profile module 255 that are described herein.

For example, as will be explained below, the processing system(s) of the predictive tachometer module 260 can access computer-readable storage media and execute computer-executable instructions stored therein to generate the predictive tachometer profile 265 that is displayed as a tachometer profile on/at the tachometer 275. For example, the predictive tachometer module 260 can use the engine acceleration and the accelerator pedal position rate provided from the ECM 240 as inputs into a lookup table 262 at the predictive tachometer profile 260 to generate an engine speed offset. The predictive tachometer module 260 can then add the engine speed offset to the current engine speed provided from the ECM 240 to generate the predictive tachometer profile 265.

Various functions performed by the processing system(s) of the tachometer profile module 255 upon loading and executing the instructions are described below in greater detail with reference to FIG. 3.

Figure 3:
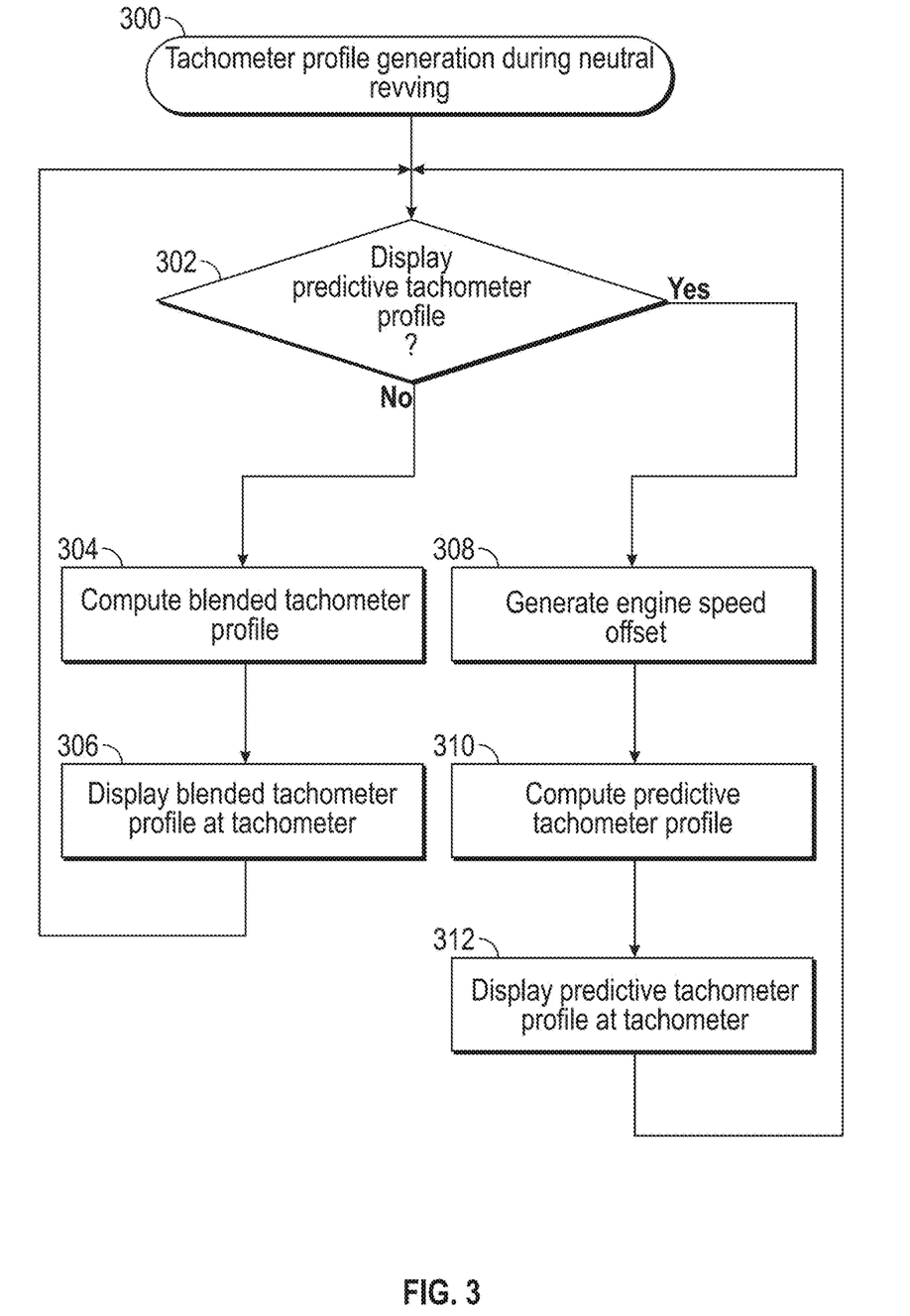
FIG. 3 is a flowchart that illustrates a method for generating a tachometer profile that is displayed at a tachometer in accordance with the disclosed embodiments.

FIG. 3 is a flowchart that illustrates a method 300 for generating a tachometer profile 265, 267 that is displayed at a tachometer 275 in accordance with the disclosed embodiments. As a preliminary matter, it should be understood that steps of the method 300 are not necessarily limiting, and that steps can be added, omitted, and/or performed simultaneously without departing from the scope of the appended claims. It should be appreciated that the method 300 may include any number of additional or alternative tasks, that the tasks shown in FIG. 3 need not be performed in the illustrated order, and that the method 300 may be incorporated into a more comprehensive procedure or process having additional functionality not described in detail herein. Moreover, one or more of the tasks shown in FIG. 3 could be omitted from an embodiment of the method 300 as long as the intended overall functionality remains intact. It should also be understood that the illustrated method 300 can be stopped at any time. The method 300 is computer-implemented in that various tasks or steps that are performed in connection with the method 300 may be performed by software, hardware, firmware, or any combination thereof. For illustrative purposes, the following description of the method 300 may refer to elements mentioned above in connection with FIGS. 1 and 2A-2B. In certain embodiments, some or all steps of this process, and/or substantially equivalent steps, are performed by execution of processor-readable instructions stored or included on a processor-readable medium. For instance, in the description of FIG. 3 that follows, the predictive tachometer module 260 will be described as performing various acts, tasks or steps, but it should be appreciated that this refers to processing system(s) of the predictive tachometer module 260 executing instructions to perform those various acts, tasks or steps. Depending on the implementation, the processing system(s) of the predictive tachometer module 260 can be centrally located, or distributed among a number of systems that work together. Likewise, although the blended tachometer module 266 will be described as performing various acts, tasks or steps, it should be appreciated that this refers to processing system(s) of the blended tachometer module 266 executing instructions to perform those various acts, tasks or steps. Depending on the implementation, the processing system(s) of the blended tachometer module 266 can be centrally located, or distributed among a number of systems that work together.

The tachometer profile module 255 can continuously receive various input parameters as described above with reference to FIGS. 2A and 2B, but it should be appreciated that certain aspects of the method 300 are used to provide a tachometer profile 265 that is displayed at the tachometer 275 only when the vehicle is stationary and not moving, whereas other aspects of the method 300 are used to provide a tachometer profile 267 that is displayed at the tachometer 275 when the vehicle is moving. For instance, the predictive tachometer profile 265 generated by the predictive tachometer module 260 is only output to the tachometer 275 when the vehicle is stationary (e.g., is in park or neutral and is not moving).

The method 300 begins at 302 when the tachometer profile module 255 determines whether a predictive tachometer profile 265 or a blended tachometer profile 267 should be generated and displayed. The tachometer profile module 255 can determine whether the predictive tachometer profile 265 or the blended tachometer profile 267 should be generated and displayed by determining whether certain conditions are met or events have occurred. The predictive tachometer profile 265 should be displayed when the vehicle is in an idle revving mode of operation. Idle revving refers to increasing the engine speed (e.g., revving the engine) when the vehicle is not moving (e.g., the vehicle speed is 0 km/h), for example, when the transmission gear and shifter of the vehicle is in park or neutral and the driver is depressing the accelerator pedal. The tachometer profile module 255 can determine (at 302) that idle revving is not allowed when the transmission gear or shifter is no longer in neutral or park, or the vehicle speed is non-zero, or signal inputs have faulted, etc. By contrast, the tachometer profile module 255 can determine (at 302) that idle revving is allowed when the transmission gear or shift is in neutral or park and the vehicle speed is zero, and there is no indication that signal inputs have faulted, etc. One non-limiting embodiment of 302 will now be described with reference to FIG. 4.

Figure 4:
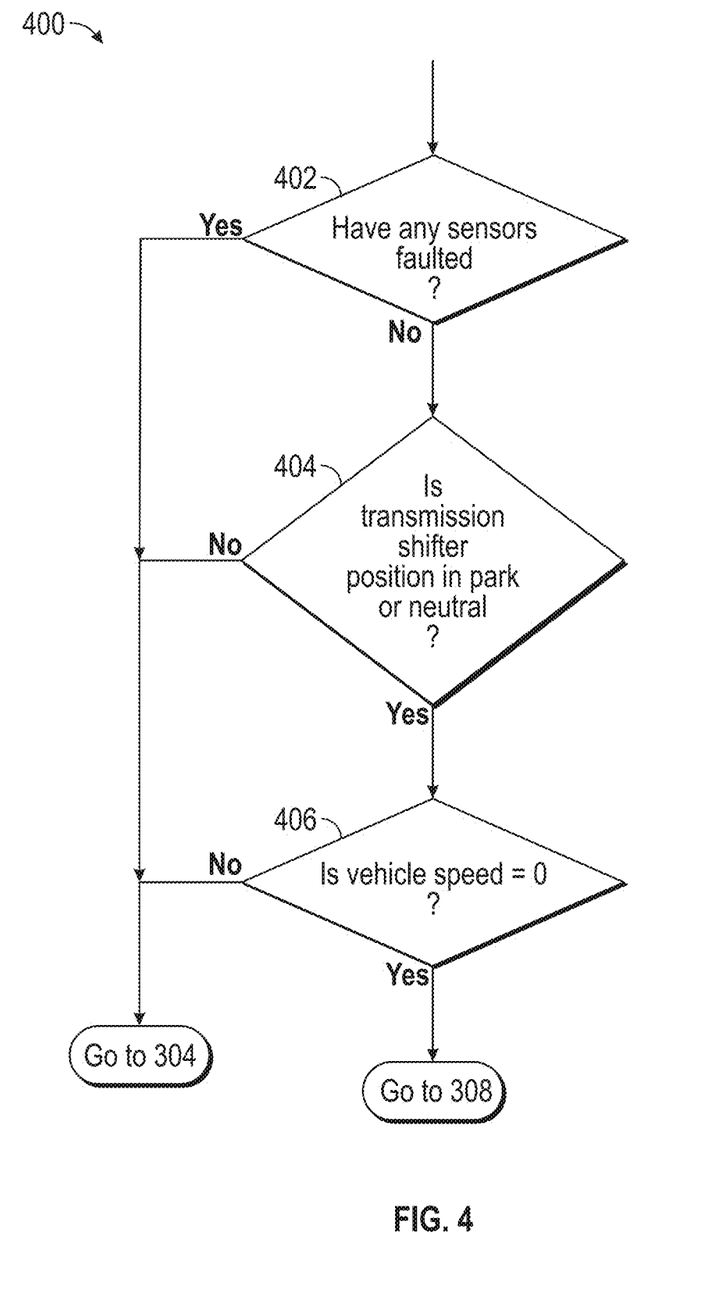
FIG. 4 is a flowchart that illustrates a method for determining whether a predictive tachometer profile or a blended tachometer should be displayed at a tachometer in accordance with the disclosed embodiments.

FIG. 4 is a flowchart that illustrates a method 400 for determining whether a predictive tachometer profile or a blended tachometer should be displayed at a tachometer in accordance with the disclosed embodiments. Preliminarily, it is noted that steps 402, 404, 406 do not need to occur in any particular order, and can occur simultaneously. Further, one or more of the steps shown could be omitted and additional steps can be added depending on the implementation. In one embodiment, the method 400 can occur once each s/w loop (e.g., every 12.5 milliseconds).

At 402, the tachometer profile module 255 determines whether any sensors (e.g., in FIGS. 2A and 2B) have faulted. When the tachometer profile module 255 determines that any sensors have faulted, this means that the predictive tachometer profile could be unreliable, and therefore the method 400 proceeds to 304 (of FIG. 3) so that the blended tachometer profile 267 can be generated and displayed. When the tachometer profile module 255 determines that none of the sensors have faulted, the method 400 proceeds to 404, where the tachometer profile module 255 determines whether the transmission shifter is in either a park position or a neutral position.

When the tachometer profile module 255 determines that the transmission shifter is not in the park position or the neutral position, this means that the predictive tachometer profile should not be displayed, and therefore the method 400 proceeds to 304 (of FIG. 3) so that the blended tachometer profile 267 can be generated and displayed. When the tachometer profile module 255 determines that the transmission shifter is in either the park position or the neutral position, the method 400 proceeds to 406, where the tachometer profile module 255 determines whether the vehicle is stationary (i.e., vehicle speed is equal to zero kilometers per hour).

When the tachometer profile module 255 determines that the vehicle is moving or not stationary (i.e., vehicle speed is not equal to zero kilometers per hour), this means that the predictive tachometer profile should not be displayed, and therefore the method 400 proceeds to 304 (of FIG. 3) so that the blended tachometer profile 267 can be generated and displayed. When the tachometer profile module 255 determines that the vehicle is stationary (i.e., vehicle speed is equal to zero kilometers per hour), the method 400 proceeds to 308. As such, the method 300 can proceed to 304 whenever any of the scenarios described above with reference to FIG. 4 occurs (e.g., whenever the tachometer profile module 255 determines that a sensor has failed, the vehicle is not in park or neutral or is moving), and the predictive tachometer profile 265 will not be output to or displayed at the tachometer 275.

Referring again to FIG. 3, when the tachometer profile module 255 determines (at 302) that the blended tachometer profile 267 should be generated and displayed, the method 300 proceeds to 304. At 304, the blended tachometer module 266 computes a blended tachometer profile 267, which is sent to the tachometer profile selection module 268. Blending occurs because the feature no longer satisfies conditions to be active (e.g., vehicle is moving and/or transmission in not in park/neutral). The goal of blending the tachometer profile is to naturally shape the tachometer profile such that it can equate to actual engine speed overtime.

In one embodiment, the predictive tachometer module 260 can generate the blended tachometer profile (BTP) using equation (1) as follows:

$$BTP=BE+BAE \qquad \text{Equation (1)},$$

where the BTP is the blended tachometer profile, BE is the blended engine speed, and BAE is the blended artificial engine speed. Equation (1) can be executed once during each software loop so that the tachometer profile dynamically shapes over time such that the tachometer profile ultimately equates to actual engine speed at the end of the blending process. In other words, the blended tachometer profile represents the transition of the predictive tachometer profile to the actual engine speed when the blending process is complete so that the actual engine speed is displayed at the end of blending. When blending is first commanded, the remaining blend percentage or first blending progression coefficient (COEFF1) is set to 100% and is reduced by a blend factor (e.g., a fixed percentage) every time the software executes a loop. The blended tachometer profile (BTP) can be computed as the sum of first blending progression coefficient (COEFF1)*blended tachometer profile during the previous loop and (1−first blending progression coefficient (COEFF1))*current engine speed. As the software loop progresses, the blended tachometer profile (BTP) has more emphasis on the current engine speed compared to the previous loop blended tachometer profile. The blended tachometer profile will be displayed on the tachometer 275 until profile is blended to actual engine speed or blending function timed out. As blend factor increases, the blended tachometer profile will more quickly approach the actual engine speed. When blending is completed, the blended tachometer profile represents the actual engine speed and shall remain so until a "YES" decision occurs at 302. After blending is complete, actual engine speed will be displayed until condition to active neutral rev is satisfied.

To explain further, the blended artificial engine speed (BAE) is equal to a product of a first blending progression coefficient (COEFF1) and the predictive tachometer profile 265 (that was generated at 314).

The blended engine speed (BE) is equal to a product of a second blending progression coefficient (COEFF2) and engine speed. The second blending progression coefficient (COEFF2) is equal to one (1) minus a current value of the first blending progression coefficient (COEFF1). In other words, the sum of the first blending progression coefficient (COEFF1) and the second blending progression coefficient (COEFF2) is always equal to one.

The current value of the first blending progression coefficient (COEFF1) is equal to a previous value of the first blending progression coefficient (COEFF1) minus a blend factor that is used to decrement the previous value of the first blending progression coefficient (COEFF1) by a fixed amount during each software loop.

The blend factor is a fixed calibratable value between zero (0) and one (1). The blend factor determines how quickly the blended tachometer profile will blend to actual engine speed. The blended tachometer profile will blend to actual engine speed in a time equal to the rate of the software loop divided by the blend factor. For example, if the blend factor is set to 0.01 and the rate of the software loop is 12.5 milliseconds, the blended tachometer profile will blend to actual engine speed in 12.5 milliseconds/0.01 or 1250 milliseconds. In addition, it should be noted that in sensor failure cases, the blending factor will be set so that blending occurs more aggressively upon sensor failure (e.g., profile will approach faster to actual engine speed). A sensor can fail or be deemed faulty, for example, when the sensor reading is stuck or out of range, or when sensor circuitry faults (e.g., short to ground, short to power, open circuit, etc.)). In such cases, once the sensor is diagnosed to be faulty or failed, then the system no longer recognizes the output from the sensor as a valid output.

The value of the blended tachometer profile (BTP) is updated each software loop until blending is determined to be complete. Blending is determined to be complete when either (1) a difference between the value of the blended tachometer profile (BTP) and engine speed is determined to be less than a calibratable threshold value, or (2) the value of the first blending progression coefficient (COEFF1) is determined to be less than or equal to zero, which means that the blending function timed out.

At 306, the tachometer profile selection module 268 outputs or provides the blended tachometer profile 267 to the tachometer 275, which displays the blended tachometer profile 267 as the tachometer profile. The method 300 then loops back to 302.

When the tachometer profile module 255 determines that the predictive tachometer profile 265 should be generated and displayed, the method 300 proceeds to 308. At 308, the lookup table 262 generates an engine speed offset. In one embodiment, at 308, the predictive tachometer module 260 determines an engine speed offset by performing a lookup in a lookup table 262 based on current engine acceleration (rpm) and accelerator pedal position rate (percent per second). The lookup table 262 is a 2D array that receives two inputs (i.e., current engine acceleration and accelerator pedal position rate) and generates an output (i.e., engine speed offset). The lookup table 262 includes a first grid vector of data points for a first parameter (i.e., accelerator pedal position rate), a second grid vector of data points for a second parameter (i.e., current engine acceleration), and a 2D array of table values (i.e., array of engine speed offset values) that are the "outputs" of the lookup table 262. The lookup table 262 replaces runtime computation with a simpler array indexing operation. The savings in terms of processing time can be significant, since retrieving a value from memory is often faster than undergoing an "expensive" computation or input/output operation.

Figure 5A:
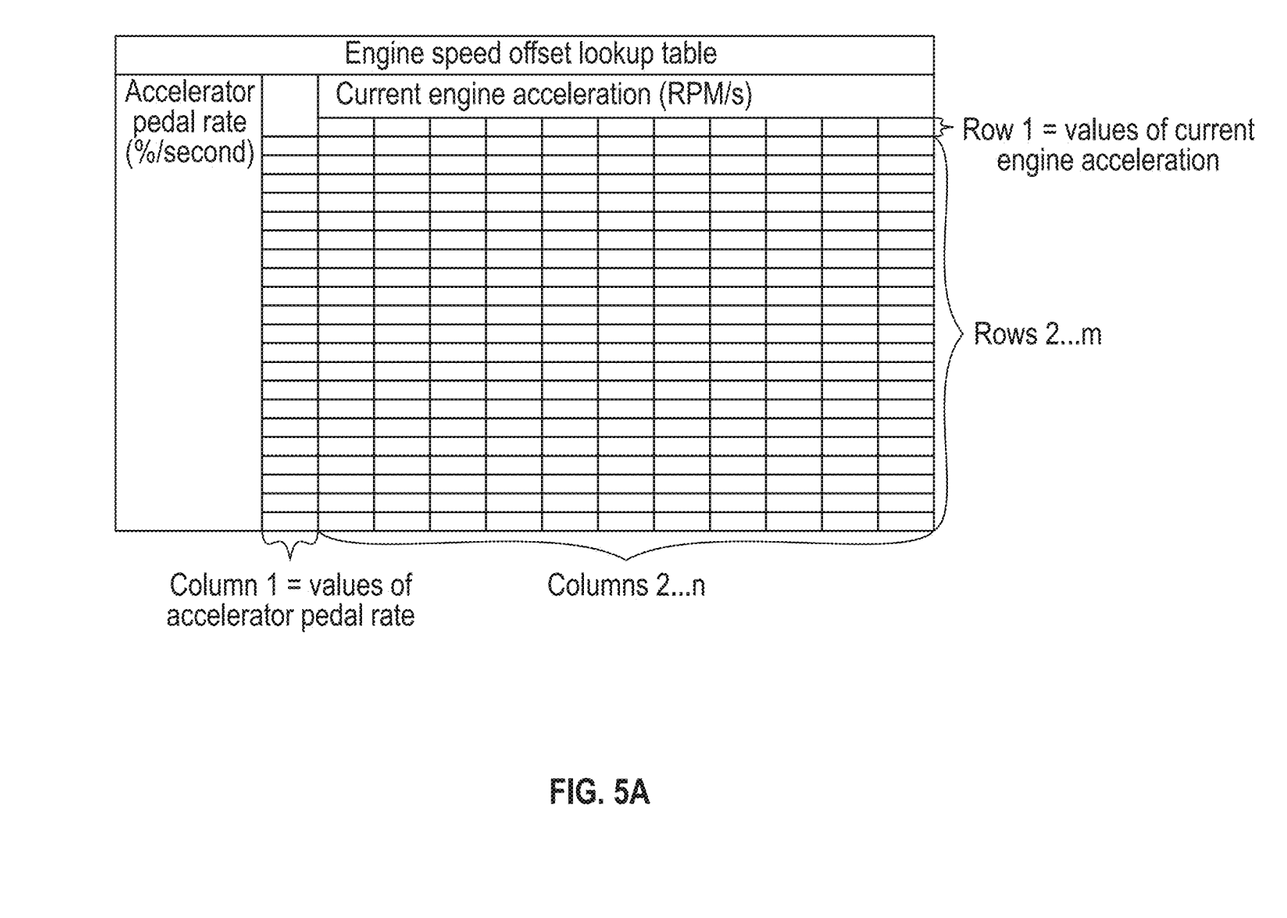
FIGS. 5A and 5B collectively illustrate a lookup table that can be used at a predictive tachometer module to generate an engine speed offset used by a predictive tachometer module to generate a predictive tachometer profile in accordance with the disclosed embodiments.
Figure 5B:
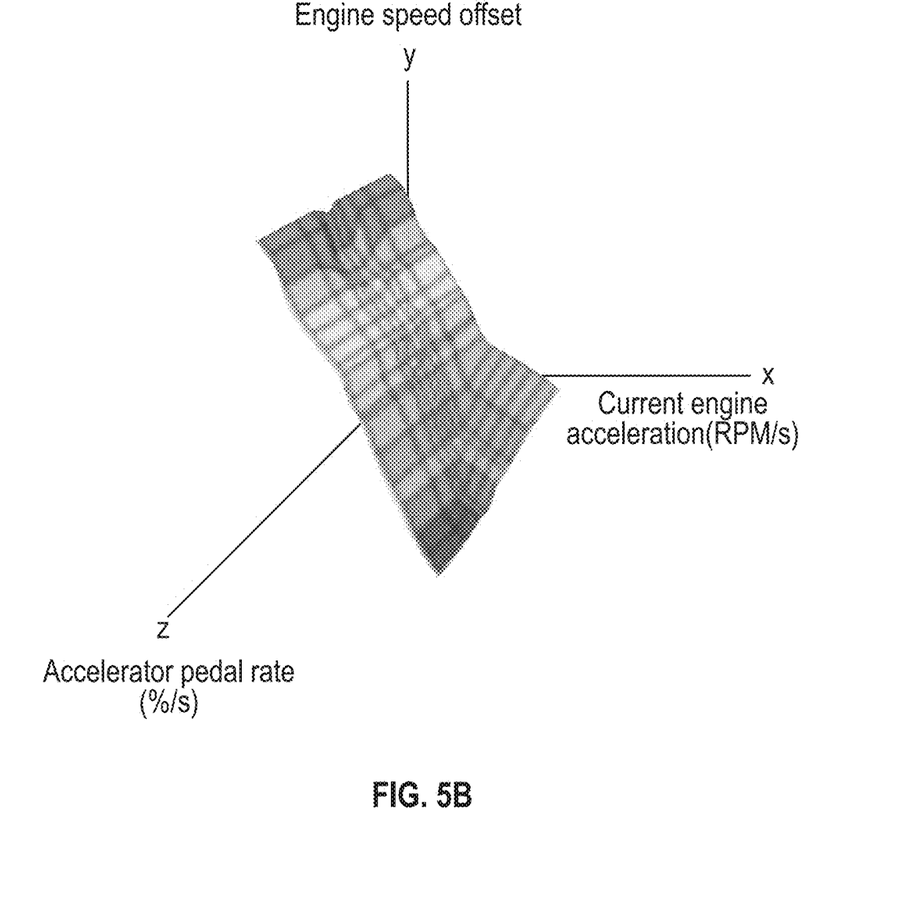

FIGS. 5A and 5B collectively and conceptually illustrate a lookup table 262 that can be used at a predictive tachometer module to generate an engine speed offset used by a predictive tachometer module 260 to generate a predictive tachometer profile in accordance with the disclosed embodiments. In FIG. 5A, the lookup table 262 in FIG. 5A includes a first grid vector (in column 1) that includes m data points for accelerator pedal position rate (in percentage per second), a second grid vector (in row 1) that includes n data points for current engine acceleration (in RPM/s), and a 2D m×n array of engine speed offset values that are the "outputs" of the lookup table 262. Any combination of a value of accelerator pedal rate from column 1 and a value of current engine speed from row 1 will correspond to a value of an engine speed offset (RPM), where the values of engine speed offset are shown in rows 2 . . . m and columns 2 . . . n. Thus, whenever a value of accelerator pedal rate and a value of current engine acceleration are input to the lookup table, the lookup table will output a value for an engine speed offset in a response to that combination of inputs.

In FIG. 5B, values of accelerator pedal rate (in percentage/second) are shown on the z-axis and values of current engine acceleration (in RPM/s) are shown on the x-axis, and the corresponding values of the engine speed offsets are plotted on the y-axis. Specifically, the z-axis represents values for accelerator pedal rate, and the z-axis represents values for the current engine acceleration, and the y-axis of the table represents various values for engine speed offsets that correspond to a particular combination of current engine speed and accelerator pedal rate. In general terms, when both the current engine acceleration and accelerator pedal rate are positive, and the engine speed offset will be positive. By contrast, when both the current engine acceleration and the accelerator pedal rate are negative, then the engine speed offset will be negative. When the accelerator pedal rate is positive and the current engine acceleration is negative, a positive engine speed offset occurs. This implies a situation where engine speed is decreasing but customer stepped in accelerator pedal. When the accelerator pedal rate is negative and current engine acceleration is positive, a positive engine speed offset occurs. This implies a situation where engine speed is increasing but driver tipped out of accelerator pedal.

Referring again to FIG. 3, at 310, the 260 computes the predictive tachometer profile 265 by adding the engine speed offset (from 308) to the current engine speed (from ECM 240), and sends the predictive tachometer profile 265 to the tachometer profile selection module 268. The engine speed offset (from 308) is used to provide better perception of engine speed change even with small accelerator pedal input. It provides an impression that engine is coherent (no delay) to accelerator pedal movement.

At 312, the tachometer profile selection module 268 outputs or provides the predictive tachometer profile 265 to the tachometer 275, which displays the predictive tachometer profile 265 as the tachometer profile. The method 300 then loops back to 302 and the method 300 repeats. Thus, in accordance with this embodiment, during idle revving events (vehicle is in park or neutral, not moving, and engine is being revved), the predictive tachometer profile 265 can be created by offsetting the actual engine speed based on current engine acceleration and accelerator pedal rate.

The foregoing description has been presented for purposes of illustration and description, but is not intended to be exhaustive or limit the scope of the claims. The embodiments described above are described to best explain one practical application, and to enable others of ordinary skill in the art to understand the invention for various embodiments with various modifications as are suited to the particular use contemplated.

In some instances, well-known components, systems, or methods have not been described in detail in order to avoid obscuring the present disclosure. Therefore, specific operational and functional details disclosed herein are not to be interpreted as limiting, but merely as a representative basis for teaching one skilled in the art.

Those of skill in the art would further appreciate that the various illustrative logical blocks and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The block diagrams in the FIGS. 1-3 illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. It will also be noted that each block of the block diagrams and/or flowchart illustration, and combinations of blocks in the block diagrams can be implemented by special purpose hardware-based systems that perform the specified functions or acts, or combinations of special purpose hardware and computer instructions.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The detailed description provides those skilled in the art with a convenient road map for implementing the exemplary embodiment or exemplary embodiments. Many modifications and variations will be apparent to those of ordinary skill in the art without departing from the scope and spirit of the invention. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for generating a tachometer profile at a tachometer of a vehicle, the method comprising:
generating an engine speed offset based on an engine acceleration and an accelerator pedal position rate;
generating a predictive tachometer profile based on the engine speed offset and an actual engine speed;
displaying the predictive tachometer profile at the tachometer;
generating, when an idle revving event is not occurring, a blended tachometer profile that progresses toward the actual engine speed as a software loop progresses, wherein generating the blended tachometer profile, comprises: summing a blended engine speed and a blended artificial engine speed to generate the blended tachometer profile that dynamically shapes over multiple software loops until the blended tachometer profile equates to the actual engine speed at the end of the blending process, wherein a first blending progression coefficient is set to one hundred percent during a first software loop and is reduced by a blend factor each time the software loop executes such that the blended tachometer profile has more emphasis on the actual engine speed compared to the blended tachometer profile during a previous software loop; and displaying the blended tachometer profile at the tachometer.

2. A method according to claim 1, further comprising:
computing, based on an accelerator pedal position input from an accelerator pedal position sensor, the accelerator pedal position rate,
wherein the predictive tachometer profile displayed at the tachometer accounts for delays in a signal path between an engine speed sensor and the tachometer.

3. A method according to claim 1, wherein generating the engine speed offset based on the engine acceleration and the accelerator pedal position rate comprises:
determining whether an idle revving event is occurring; and
when it is determined that the idle revving event is occurring, generating the engine speed offset based on the engine acceleration and the accelerator pedal position rate.

4. A method according to claim 3, wherein the idle revving event is occurring when the vehicle is stationary and an accelerator pedal of the vehicle is being depressed to cause an engine speed of the vehicle to increase.

5. A method according to claim 3, wherein the idle revving event is occurring when a determination is made that: a sensor has not failed; the vehicle is in park or neutral; and the vehicle is not moving.

6. A method according to claim 1, wherein generating an engine speed offset based on an engine acceleration and an accelerator pedal position rate, comprises:
performing a lookup in a lookup table for the engine speed offset based on inputs comprising: the engine acceleration and the accelerator pedal position rate, wherein the lookup table includes a first grid vector of data points for the accelerator pedal position rate, a second grid vector of data points for the current engine acceleration, and an array of engine speed offset values that are outputs of the lookup table.

7. A method according to claim 1, wherein generating a predictive tachometer profile based on the engine speed offset and an actual engine speed comprises:
summing the engine speed offset and the actual engine speed to generate the predictive tachometer profile.

8. A method according to claim 1, wherein the idle revving event is not occurring when a determination is made that:
a sensor has failed;
the vehicle is not in park or neutral; or
the vehicle is moving.

9. A method according to claim 1, wherein the blended artificial engine speed is equal to a product of a first blending progression coefficient and the predictive tachometer profile, and wherein the blended engine speed is equal to a product of a second blending progression coefficient and engine speed, and
wherein the current value of the first blending progression coefficient is equal to a previous value of the first blending progression coefficient minus a blend factor that is used to decrement the previous value of the first blending progression coefficient by a fixed amount during each software loop.

10. A method according to claim 1, wherein the second blending progression coefficient is equal to one minus a current value of the first blending progression coefficient such that a sum of the first blending progression coefficient and the second blending progression coefficient is equal to one.

11. A method according to claim 1, wherein the blend factor has a value between zero and one, and determines how quickly the blended tachometer profile will blend to the actual engine speed, wherein the blended tachometer profile will blend to actual engine speed in a time equal to a rate of the software loop divided by the blend factor.

12. A method according to claim 1, wherein a value of the blended tachometer profile is updated each software loop until blending is determined to be complete, wherein blending is determined to be complete when either: a difference between the value of the blended tachometer profile and the actual engine speed is determined to be less than a calibratable threshold value, or the value of the first blending progression coefficient is determined to be less than or equal to zero.

13. A vehicle, comprising:
an accelerator pedal;
a processor configured to:
execute a predictive tachometer module, wherein the predictive tachometer module is configured to generate a predictive tachometer profile based on an engine speed offset and an actual engine speed, wherein the engine speed offset is determined based on an engine acceleration and an accelerator pedal position rate;
generate, when an idle revving event is not occurring, a blended tachometer profile that progresses toward the actual engine speed as a software loop progresses by summing a blended engine speed and a blended artificial engine speed to generate the blended tachometer profile that dynamically shapes over multiple software loops until the blended tachometer profile equates to the actual engine speed at the end of the blending process, wherein a first blending progression coefficient is set to one hundred percent during a first software loop and is reduced by a blend factor each time the software loop executes such that the blended tachometer profile has more emphasis on the actual engine speed compared to the blended tachometer profile during a previous software loop; and
a tachometer configured to display the predictive tachometer profile and to display the blended tachometer profile when the idle revving event is not occurring.

14. A predictive tachometer module, comprising:
a processor; and
a memory that is configured to store computer-executable instructions that are capable of execution by the processor, and that when executed by the processor, cause the processor to:
determine an engine speed offset based on an engine acceleration and an accelerator pedal position rate; and
generate a predictive tachometer profile based on an engine speed offset and an actual engine speed; and
generate, when an idle revving event is not occurring, a blended tachometer profile that progresses toward the actual engine speed as a software loop progresses by summing a blended engine speed and a blended artificial engine speed to generate the blended tachometer profile that dynamically shapes over multiple software loops until the blended tachometer profile equates to the actual engine speed at the end of the blending process, wherein a first blending progression coefficient is set to one hundred percent during a first software loop and is reduced by a blend factor each time the software loop executes such that the blended tachometer profile has more emphasis on the actual engine speed compared to the blended tachometer profile during a previous software loop.

* * * * *